United States Patent
Franck et al.

(10) Patent No.: US 7,337,624 B2
(45) Date of Patent: Mar. 4, 2008

(54) REFRIGERATION SYSTEM AND METHOD FOR BEVERAGE DISPENSER

(75) Inventors: Doug Franck, Marietta, GA (US); Darren Wayne Simmons, Peachtree City, GA (US); Daniel J. Peck, Covington, GA (US); Richard Carroll Staten, Woodstock, GA (US)

(73) Assignee: The Coca-Cola Company, Atlanta, GA (US)

(*) Notice: Subject to any disclaimer, the term of this patent is extended or adjusted under 35 U.S.C. 154(b) by 81 days.

(21) Appl. No.: 11/099,671

(22) Filed: Apr. 6, 2005

(65) Prior Publication Data

US 2005/0229622 A1 Oct. 20, 2005

Related U.S. Application Data

(63) Continuation-in-part of application No. 10/397,255, filed on Mar. 27, 2003, now abandoned.

(51) Int. Cl.
 *A23G 9/00* (2006.01)
(52) U.S. Cl. .................... 62/183; 62/228.2; 62/342
(58) Field of Classification Search ................ 62/183, 62/228.4, 342–343, 506–508, 389–400, 228.2
 See application file for complete search history.

(56) References Cited

U.S. PATENT DOCUMENTS 3,357,199 A 12/1967 Harnish (Continued)

FOREIGN PATENT DOCUMENTS

JP 2003/042610 2/2003

(Continued)

OTHER PUBLICATIONS

International Search Report for International Application No. PCT/US2004/008793, European Patent Office, mailed Jul. 27, 2004.

(Continued)

*Primary Examiner*—William E Tapolcai
(74) *Attorney, Agent, or Firm*—Finnegan, Henderson, Farabow, Garrett & Dunner, L.L.P.

(57) ABSTRACT

A method of regulating the refrigerant temperature for a beverage machine, including a refrigeration system for producing a frozen beverage, operating at least one compressor at a speed to flow the refrigerant through the refrigeration system of the beverage machine and cooling the refrigerant with at least one condenser. The method may also include controllably varying the flow of air across the at least one condenser or the speed of the at least one compressor.

44 Claims, 4 Drawing Sheets

U.S. PATENT DOCUMENTS

| | | | |
|---|---|---|---|
| 3,389,576 A * | 6/1968 | Mauer | 62/196.4 |
| 3,400,551 A * | 9/1968 | Booth et al. | 62/135 |
| 3,481,152 A | 12/1969 | Seeley | |
| 3,633,376 A | 1/1972 | Miner | |
| 3,759,056 A * | 9/1973 | Graber | 62/183 |
| 3,769,810 A * | 11/1973 | Swartwout | 62/183 |
| 4,139,356 A | 2/1979 | Hattori | |
| 4,450,692 A | 5/1984 | Sharpe et al. | |
| 4,707,997 A | 11/1987 | Bigler et al. | |
| 5,211,025 A | 5/1993 | Ni et al. | |
| 5,535,600 A | 7/1996 | Mills | |
| 5,671,607 A * | 9/1997 | Clemens et al. | 62/228.4 |
| 5,894,734 A | 4/1999 | Morishita et al. | |
| 6,155,461 A | 12/2000 | Ishihara et al. | |
| 6,205,803 B1 | 3/2001 | Scaringe | |
| 6,220,047 B1 | 4/2001 | Vogel et al. | |
| 6,513,578 B2 | 2/2003 | Frank | |
| 7,000,411 B2 * | 2/2006 | Kim et al. | 62/183 |
| 2002/0033021 A1 | 3/2002 | Frank | |
| 2002/0095944 A1 | 7/2002 | Stensrud et al. | |
| 2002/0197376 A1 | 12/2002 | Broz | |
| 2003/0145607 A1 | 8/2003 | Frank | |

FOREIGN PATENT DOCUMENTS

| | | |
|---|---|---|
| WO | WO-86/00363 A1 | 1/1986 |
| WO | WO-01/01052 A1 | 1/2002 |

OTHER PUBLICATIONS

International Search Report for PCT/US2006/012356, mailed Aug. 8, 2006.

International Search Report for PCT/US2004/008793, mailed Jun. 16, 2005.

* cited by examiner

REFRIGERATION SYSTEM AND METHOD FOR BEVERAGE DISPENSER

This application is a Continuation-In-Part of application Ser. No. 10/397,255, which was filed on Mar. 27, 2003, now abandoned and which is incorporated herein by reference.

BACKGROUND OF THE INVENTION

The invention relates to a system and method for making frozen beverages and, more specifically, to a system and method for making reduced-calorie ("light") and diet frozen beverages.

Full-calorie frozen beverages are known in the art and have been produced for years. Frozen beverages are produced via devices that freeze a mixture of ingredients including syrup, water, and optionally, carbon dioxide in a mixing chamber. The mixture freezes on the inner surface of the mixing chamber, which is surrounded by a helical coil through which a refrigerant passes. A rotating shaft is disposed inside the chamber, which has a plurality of outwardly projecting blades that scrape the frozen mixture off the inside wall of the mixing chamber. Once the beverage is in the desired frozen state, the product is dispensed from the chamber through a product valve.

Current frozen beverage products are generally limited to full-calorie frozen beverages. Caloric products contain common sugars, such as sucrose or high fructose corn syrup ("HFCS"), which are used as sweeteners. These sugars play an important part in the freezing point depression of frozen beverages. Under normal operating conditions of frozen beverage machines, the addition of caloric sweeteners depresses the freezing point of the product, making them dispensable in a slush-like state. By contrast, a diet beverage—or non-caloric beverage—contains no common sugars such as sucrose or corn syrup, and thus lacks a freezing point depressant. Without this modified freezing point, diet syrup freezes into blocks of ice in a conventional frozen beverage machine.

The degree of sweetness in a beverage is generally listed, or measured, by a brix value. Brix value is generally defined as the percent of soluble solids made up of sugars. A blend having a high brix value generally tends to be sweeter and may be difficult to freeze. On the other hand, a beverage having a low brix value, for example, less than 10, may be too icy when frozen. Since the brix value of diet or low-calorie beverages typically ranges from about 3.5 to about 5.0, commercial success for dispensing diet or low-calorie frozen beverages has been minimal.

In some conventional frozen beverage machines for diet, low-calorie, and reduced-calorie beverages, the freezing point of the syrup is depressed by the addition of sugars and HFCS. This solution, however, may raise the brix value of the beverage beyond the permissible limit for low-calorie, diet, and reduced-calorie products. A frozen beverage machine capable of producing a diet or low-calorie frozen beverage, which has a brix value of less than about 7.5, while having the consistency of a full-calorie frozen beverage (i.e., without large pieces of ice) is desired.

In some beverage machines, the temperature and viscosity of the ingredients within the mixing chamber are maintained by a control system that controls the refrigeration system. Product quality is controlled through the balance of ingredients as well as pressures and temperatures within the chamber.

The present invention may overcome one or more of the problems associated with the production of diet frozen beverages through the use of a refrigeration configuration and/or one or more control schemes that allow the available refrigeration capacity to adjust for dynamic evaporating loads, while maintaining uniform saturation and/or flooding of the evaporator at a controlled desired temperature. Thus, the present invention may enable diet or light-product to freeze uniformly and dispense consistently from initial freeze through extended low-draw conditions. Additionally, the present invention may enable a higher level of control with respect to ice crystal formation, which may enable the equipment to produce products having a consistency that is a closer representation of HFCS-based products.

SUMMARY OF THE INVENTION

As stated earlier, a beverage having a low brix value may be too icy when frozen. The method of the present invention, however, permits the production of frozen beverages with a desired consistency that have an overall brix value from about 0 to about 7.5.

According to one aspect of the invention, a refrigeration system for use in the beverage dispenser may comprise at least one condensing fan. The one or more condensing fans may each operate at varying speeds, depending on the desired air flow across the condenser. The varying speeds may either involve using a variable speed controller, which allows the speed of a fan to be incrementally adjusted over many speeds, or a multiple-speed fan controller, which permits the speed of a fan to be adjusted between a finite number of speeds (e.g., low, medium, or high). Alternatively, the desired flow of air flow across the condenser may be achieved by alternating one or more condensing fans between energized (i.e., on) to de-energized (i.e., off).

According to another aspect of the invention, a refrigeration system for use in the beverage dispenser may comprise at least one louver. The one or more louvers can each be adjusted between opened and closed to permit, adjust, or restrict the flow of air across the condenser.

According to yet another aspect of the invention, the desired temperature of the refrigerant across the evaporator may be controlled from about 15° F. to about 30° F.

According to still another aspect of the invention, a refrigeration system for use in the beverage dispenser may comprise at least one adjustable-speed compressor. The one or more compressors' speeds may be adjusted by either a variable speed control, which allows the speed of the compressor to be incrementally adjusted over many speeds, or a multiple-speed pump control, which permits the speed of the compressor to be adjusted from a finite number of speeds (e.g., low, medium, or high).

According to still another aspect of the invention, a refrigeration system for use in the beverage dispenser may comprise at least one accumulator and at least one hot-gas bypass valve. The one or more hot-gas bypass valves' positions may be adjusted to cause at least some refrigerant to flow from a compressor outlet to an accumulator without first entering a condenser or evaporator.

According to still another aspect of the invention, a refrigeration system for use in the beverage dispenser may comprise at least one defrost bypass valve. The one or more defrost bypass valves' positions may be adjusted to cause at least some refrigerant to flow from a compressor outlet to an expansion valve inlet without first entering the condenser or condenser bypass valve.

According to still another aspect of the invention, a refrigeration system for use in the beverage dispenser may comprise at least one condenser bypass valve. The one or more condenser bypass valves' positions may be adjusted to cause at least some refrigerant to flow from a condenser inlet to a condenser outlet without first entering a condenser.

According to still another aspect of the invention, a refrigeration system for use in the beverage dispenser may comprise at least one liquid line bypass valve. The one or more liquid line bypass valves' positions may be adjusted to cause at least some refrigerant to flow from a condenser outlet to an accumulator without first entering an evaporator.

The reader should understand that both the foregoing general description and the following detailed description are exemplary and explanatory only and are not restrictive of the invention.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings.

DETAILED DESCRIPTION OF THE INVENTION

Reference will now be made in detail to the exemplary embodiments of the invention, examples of which are illustrated in the accompanying drawings. Wherever possible, the same reference numbers will be used throughout the drawings to refer to the same or like parts.

Figure 1:
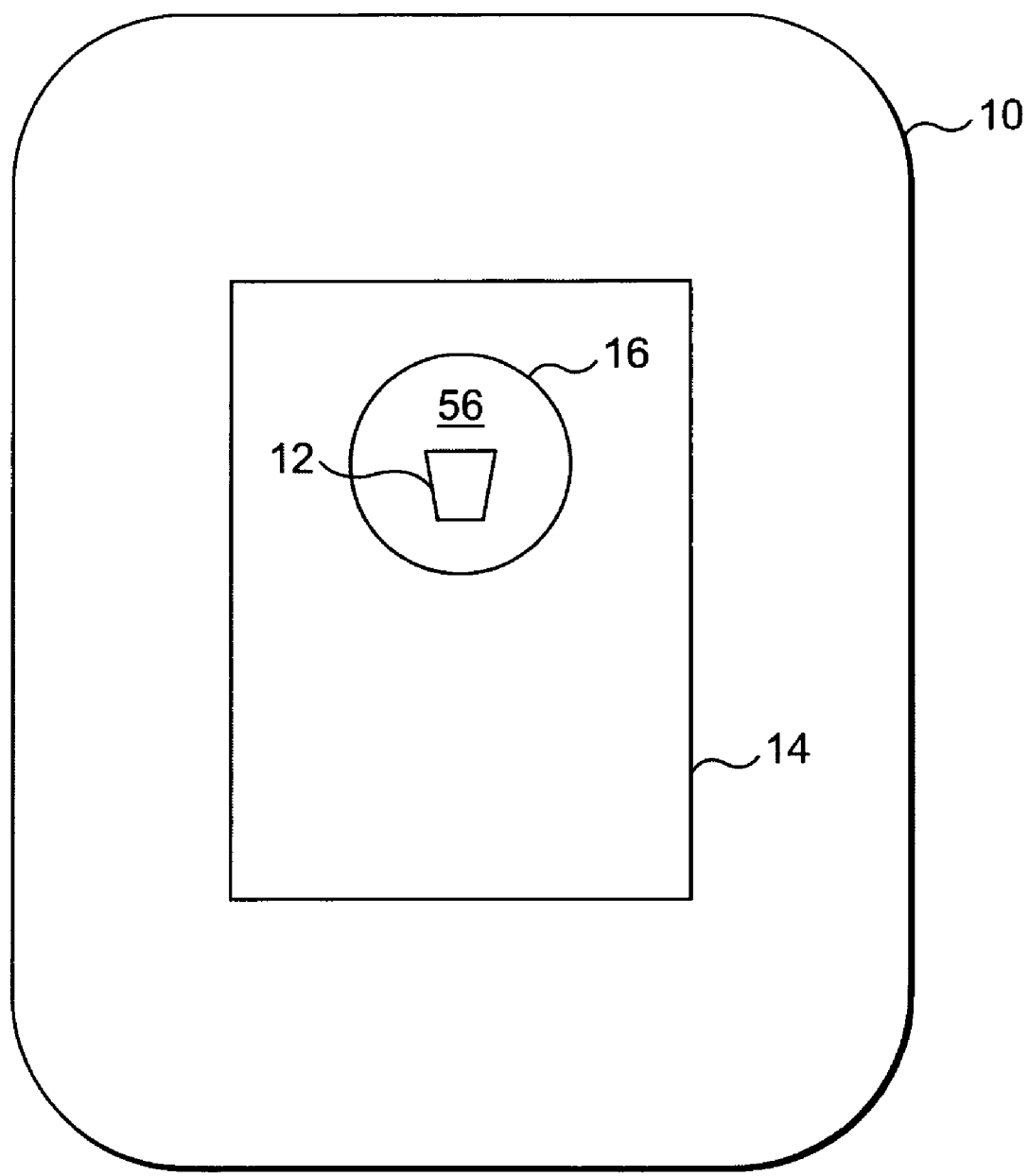
FIG. 1 is a schematic view of a beverage dispenser consistent with exemplary aspects of the invention.

In accordance with the invention, a refrigeration system 14 for use in, for example, a frozen beverage machine 10 is provided. Referring to FIG. 1, a frozen beverage machine 10 may include a container 16, which is configured to contain a beverage 56, a dispenser 12 for dispensing the frozen beverage 56 from the machine 10, and a refrigeration system 14 for cooling the beverage 56.

Figure 2:
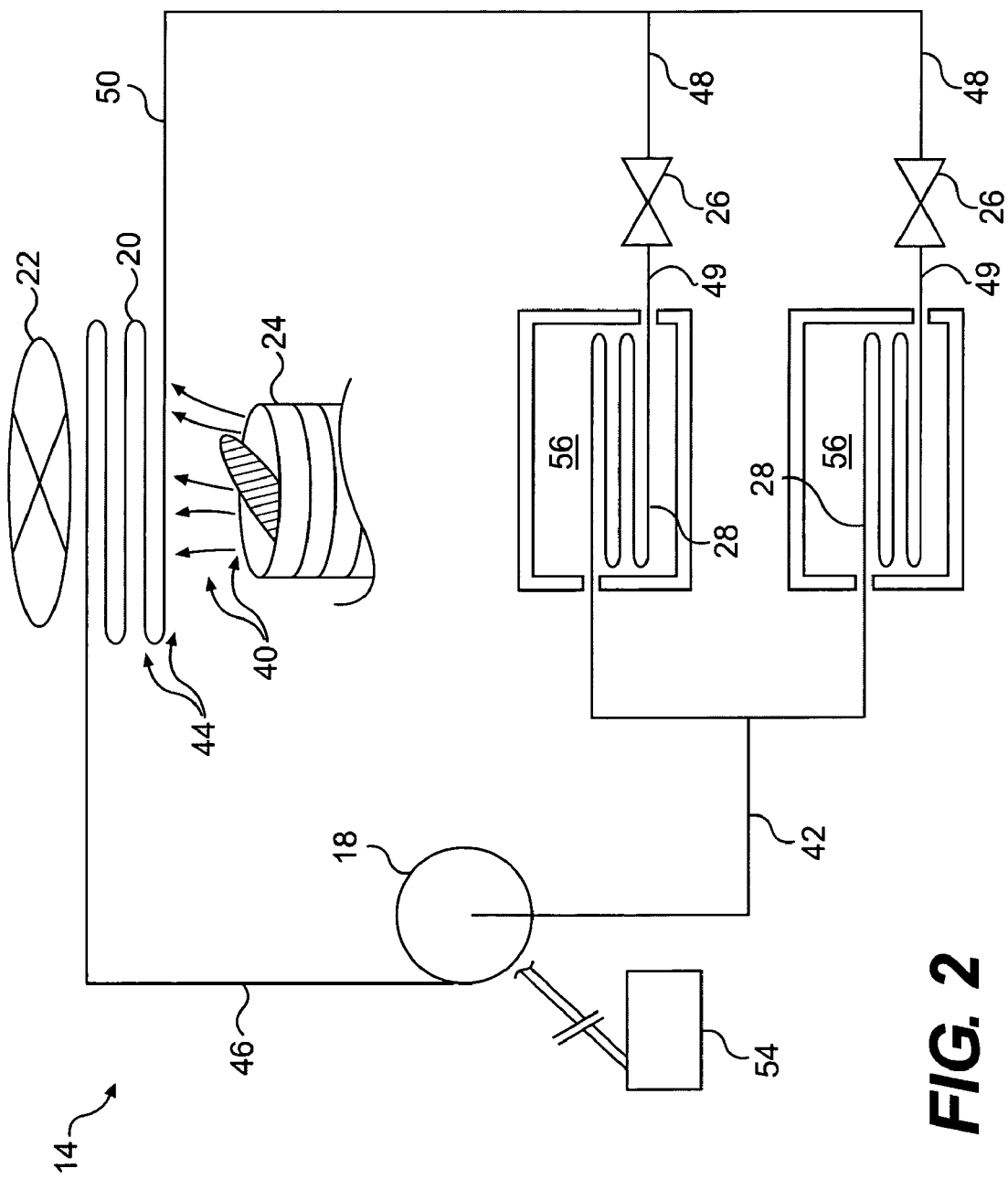
FIG. 2 is a schematic view of a refrigeration system in accordance with at least one exemplary aspect of the invention.

Referring now to FIG. 2, the refrigeration system 14 may include a compressor 18, a condenser 20, and at least one evaporator 28. The refrigeration system 14 transfers thermal energy from the beverage 56 to the ambient environment 44 via a refrigerant, for example, freon.

The compressor 18 comprises a pump, for example, an electrical pump, that compresses the refrigerant in the refrigeration system 14 and sends it to the condenser 20 and then into the evaporator 28. The refrigerant is returned to the compressor 18 through a compressor suction line 42.

The condenser 20 comprises a heat exchanger, which may include coils stacked, for example, under or behind the frozen beverage machine 10. The condenser 20 is configured to remove thermal energy—or heat—from the refrigerant and transfers the heat to the ambient environment 44. During this heat transfer, the refrigerant may undergo a phase transformation from gaseous to liquid form.

The refrigeration system 14 may also include one or more condensing fans 22 associated with the condenser 20. The condensing fan 22 circulates air across the condenser 20 to improve the convective heat transfer from the refrigerant to the ambient environment 44.

The refrigeration system 14 may also include one or more expansion valves 26. Each expansion valve 26 has a high-pressure inlet 48—where liquid refrigerant enters—and a low-pressure outlet 49—where liquid refrigerant exits. The expansion valve 26 lowers the pressure of the refrigerant before the refrigerant enters the evaporator 28. The lower pressure permits the refrigerant to "boil" or undergo a phase transformation from liquid to vapor in the evaporator 28. Alternatively, a capillary tube can be used to effectuate this pressure drop. After the liquid refrigerant exits the expansion valve 26, the refrigerant enters the evaporator 28 where it once again absorbs heat from the beverage 56 and thus begins another cycle through the system 14.

The evaporator 28 comprises a heat exchanger configured to "cool" the beverage 56. In the evaporator 28, thermal energy is transferred from the beverage 56 to the refrigerant. That is, heat is drawn out of the beverage 56, thereby lowering the temperature of the beverage 56. During this heat transfer, the refrigerant may undergo a phase transformation and change from liquid to gaseous form. As can be seen in FIG. 2, multiple evaporators 28 can be used in the refrigeration system 14. Two evaporators 28 are shown in FIG. 2, however, one skilled in the art would recognize that any number of evaporators 28 may effectively be used.

The refrigerant transfers from liquid to gaseous phase ("boils") in the evaporator 28 as it absorbs thermal energy, i.e., heat, from the beverage 56. After the refrigerant has absorbed the thermal energy from the beverage 56, the now vaporous, heat-laden refrigerant passes through a suction line 42 to the compressor 18. The compressor 18 compresses and discharges the vaporized refrigerant to the condenser 20 via the compressor outlet 46. In the condenser 20, some of the refrigerant's thermal energy is transferred to the ambient environment 44. As the refrigerant "cools" in the condenser 20, the refrigerant transfers from its gaseous to its liquid phase (i.e., condenses). From the condenser outlet 50, the liquid refrigerant enters an expansion valve 26.

In the exemplary embodiment of FIG. 2, the refrigeration system 14 includes a louver 24 associated with the condenser 20. Airflow 40 through the louver 24 also passes adjacent to and/or around the condenser 20. The position of the louver 24 may be adjusted incrementally from anywhere between closed to open. Adjusting the position of the louver 24 permits the regulation of airflow 40 across the condenser 20. Although FIG. 2 displays only one louver 24, one skilled in the art would recognize that two or more louvers 24 may effectively be used.

Alternatively or additionally, an exemplary embodiment of the refrigeration system 14 of FIG. 2 may also include a compressor controller 54. The compressor controller 54 can be operated to regulate the speed of the compressor 18. The controller 54 can be cycled "on" and "off" to control the refrigerant temperature. Alternatively, the controller 54 may be a variable-speed controller, which permits the speed of the compressor 18 to be adjusted incrementally and very precisely. Alternatively, the controller 54 may be a multiple-speed controller that includes a finite number of operating speeds, such as, for example, "low," "medium," and "high." Although FIG. 2 only displays one compressor 18 and one controller 54, one skilled in the art would recognize that two or more compressors 18 and two or more controllers 54 may effectively be used.

Figure 3:
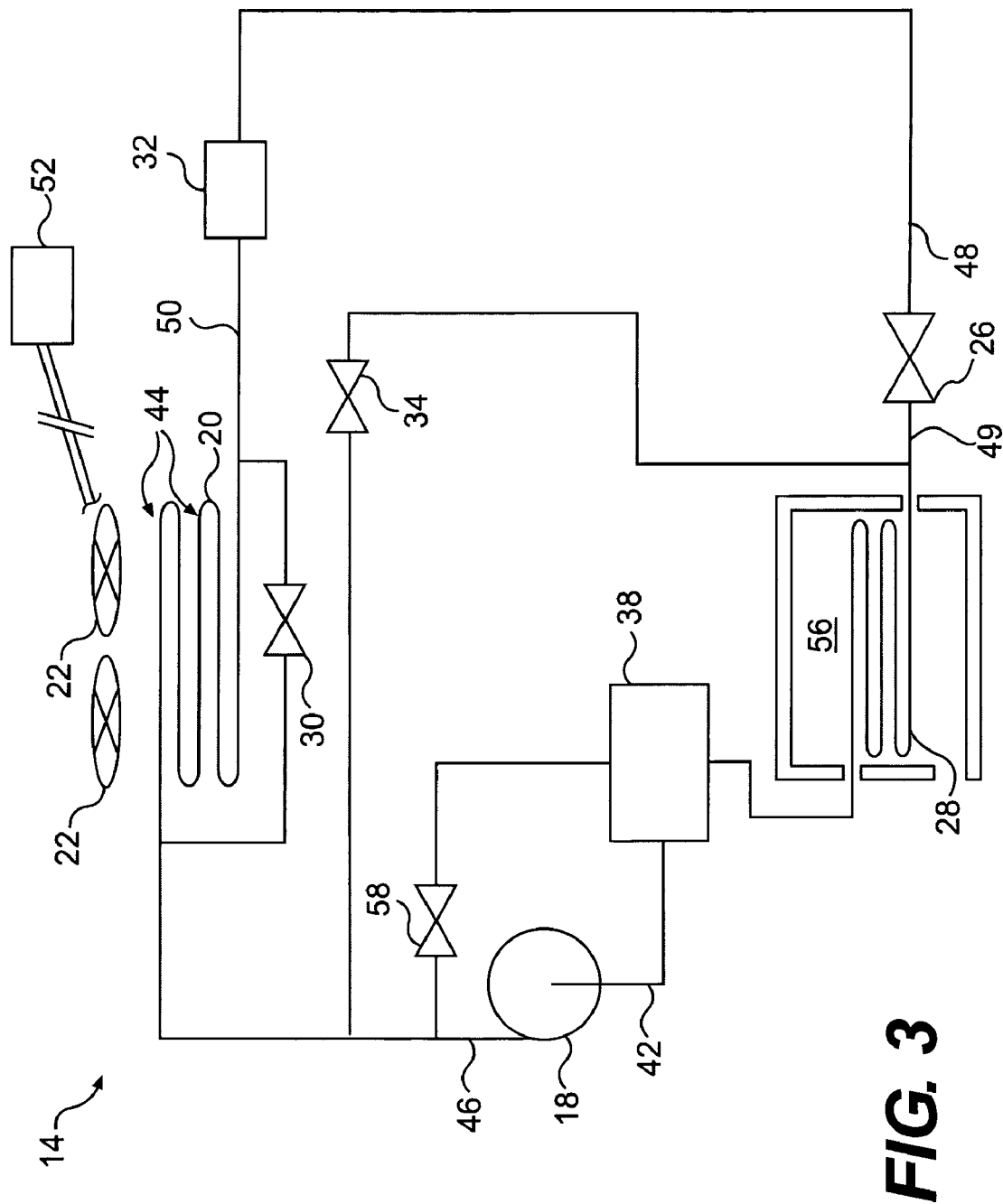
FIG. 3 is a schematic view of another refrigeration system in accordance with at least one exemplary aspect of the invention.

Referring now to FIG. 3, an exemplary embodiment of the refrigeration system 14 may include a defrost bypass valve 34. The defrost bypass valve 34 permits some refrigerant to flow from a compressor outlet 46 to the expansion valve outlet 49 without first entering the condenser 20 or condenser bypass valve 30. Although FIG. 3 only displays one defrost bypass valve 34, one skilled in the art would recognize that two or more defrost bypass valves 34 may effectively be used.

Alternatively or additionally, an exemplary embodiment of the refrigeration system 14 of FIG. 3 may include a condenser bypass valve 30. The condenser bypass valve 30 permits some refrigerant to flow from the compressor outlet 46 to the condenser outlet 50 without first entering the condenser 20. Although FIG. 3 only displays one condenser bypass valve 30, one skilled in the art would recognize that two or more condenser bypass valves 30 may effectively be used.

Alternatively or additionally, an exemplary embodiment of the refrigeration system 14 of FIG. 3 may include an accumulator 38 and a hot-gas bypass valve 58. The hot-gas bypass valve 58 permits some refrigerant to flow from the compressor outlet 46 to the accumulator 38 without first entering the condenser 20, condenser bypass valve 30, and evaporator 28. Although FIG. 3 only displays one accumulator 38 and one hot-gas bypass valve 58, one skilled in the art would recognize that two or more accumulators 38 and two or more hot-gas bypass valves 58 may effectively be used.

Alternatively or additionally, an exemplary embodiment of the refrigeration system 14 of FIG. 3 may include a condensing fan controller 52. The condensing fan controller 52 can be operated to adjust the speed of the condensing fan 22 and the controller 52 permits the condensing fan 22 to operate independent of the compressor 18. The controller 52 can be cycled between "on" and "off" to control the refrigerant temperature. Alternatively, the controller 52 may be a variable-speed controller, which permits the speed of the fan 22 to be adjusted very precisely. Alternatively, the controller 52 may be a multiple-speed controller that includes a finite number of operating speeds, such as, for example, "low," "medium," and "high."

Alternatively or additionally, an exemplary embodiment of the refrigeration system 14 of FIG. 3 may include a plurality of condensing fans 22. The fans 22 may be operated singly, in unison, or in any other combination. For example, a four-fan configuration may be operated as follows: one fan can be operated at "high" while a second fan is de-energized (i.e., in "off") and while the third and fourth fans are operated at "medium" speed. Although FIG. 3 only displays two fans 22, one skilled in the art would recognize that any number of fans 22 and controllers 52 may effectively be used.

As can be seen in FIG. 3, the system 14 may include a drier 32, which removes water moisture from the system 14.

Figure 4:
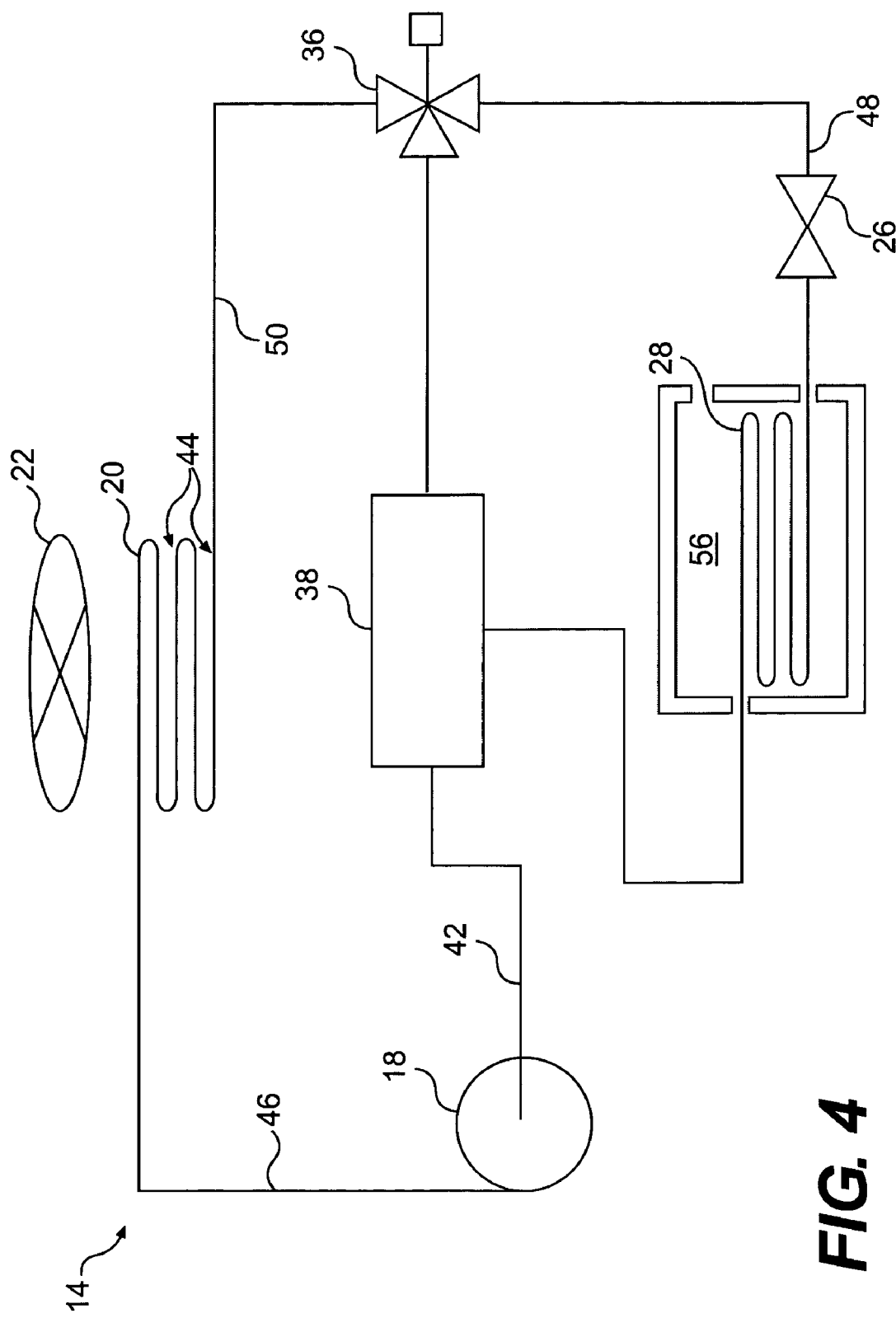
FIG. 4 is a schematic view of another refrigeration system in accordance with at least one exemplary aspect of the invention.

Referring now to FIG. 4, an exemplary embodiment of the refrigeration system 14 may include an accumulator 38 and a liquid line bypass valve 36. The liquid line bypass valve 36 may be a three-way valve that, when in the "bypass position," permits some refrigerant to flow from the condenser outlet 50 to the accumulator 38 without first entering the expansion valve 26 or evaporator 28. The accumulator 38 comprises a storage tank that receives liquid refrigerant, usually from the evaporator 28, and prevents it from flowing into the suction line 42 before vaporizing. Although FIG. 4 only displays one accumulator 38 and one liquid line bypass valve 36, one skilled in the art would recognize that two or more accumulators 38 and two or more liquid line bypass valves 36 may effectively be used.

Any of the exemplary embodiments listed above can be combined to further regulate the temperature of the refrigeration system 14. Additionally, adjusting a refrigerant charge may further be used to regulate the temperature of the refrigeration system 14.

Any of the exemplary embodiments of FIGS. 2-4 described above permit the control of the refrigerant's temperature through the refrigeration system 14. In an exemplary embodiment, the refrigeration system 14 may be used to maintain the temperature of the refrigerant in the evaporator 28 from about 15° F. to about 30° F.

For example, regulating the refrigerant's temperature may be accomplished by any one of the following, either alone or in combination: the speed of one or more condensing fans 22 may be adjusted; one or more condensing fans 22 can be cycled from "on" to "off"; the louver 24 may be positioned from anywhere between "shut" to "open"; the hot-gas bypass valve's 58 position can be adjusted; the defrost bypass valve's 34 position can be adjusted; the one or more condenser bypass valves' 30 positions may be adjusted; the liquid line bypass valve's 36 position may be adjusted; the speed of one or more compressors 18 may be adjusted; and the type or quantity of the refrigerant may be adjusted.

It will be apparent to those skilled in the art that various modifications and variations can be made to the structure and methodology of the present invention without departing from the scope or spirit of the invention. Thus, it should be understood that the invention is not limited to the examples discussed in the specification. Rather, the present invention is intended to cover modifications and variations of this invention.

What is claimed is:

1. A method of regulating a refrigerant temperature in a beverage machine having a refrigeration system for producing a frozen beverage therein, the method comprising:
   providing a first type of beverage having a brix value lower than a brix value of a second type of beverage, wherein the first type of beverage is a diet beverage;
   operating at least one compressor at a speed to flow a refrigerant through a refrigeration system of the beverage machine;
   cooling the refrigerant with at least one condenser; and
   partially freezing the first type of beverage by controllably varying at least one of (1) the flow of air across the at least one condenser and (2) the speed of the at least one compressor so as to regulate a temperature of the refrigerant and compensate for the lower brix value of the first type of beverage than the brix value of the second type of beverage.

2. The method of claim 1, wherein said controllably varying the flow of air across the at least one condenser comprises adjusting the speed of at least one condensing fan.

3. The method of claim 1, wherein said controllably varying the flow of air across the at least one condenser comprises cycling at least one condensing fan between on and off.

4. The method of claim 1, wherein said controllably varying the flow of air across the at least one condenser comprises adjusting an opening position of at least one louver configured to direct the airflow across the at least one condenser.

5. The method of claim 1, wherein the brix value of the partially frozen first type of beverage ranges from about 0 to about 7.5.

6. The method of claim 1, further comprising adjusting a refrigerant charge.

7. The method of claim 1, further comprising regulating the refrigerant temperature across the evaporator from about 15° F to about 30° F.

8. The method of claim 1, wherein the second type of beverage is a nondiet beverage, and partially freezing the first type of beverage includes forming a partially frozen diet beverage that has substantially the same consistency as a partially frozen nondiet beverage.

9. The method of claim 1, wherein the first type of beverage has a brix value less than about 10.

10. The method of claim 1, wherein the first type of beverage has a brix value less than about 7.5.

11. The method of claim 1, wherein the first type of beverage has a brix value between about 3.5 and about 5.0.

12. The method of claim 1, wherein the first type of beverage has a brix value of about 0.

13. The method of claim 1, further comprising dispensing the partially frozen first type of beverage in a substantially slushy state.

14. The method of claim 1, wherein the first type of beverage is a low-calorie beverage, the second type of beverage is a high-calorie beverage, and partially freezing the first type of beverage includes forming a partially frozen low-calorie beverage that has substantially the same consistency as a partially frozen nondiet beverage.

15. The method of claim 1, wherein the first type of beverage has a higher freezing point than a freezing point of the second type of beverage, and partially freezing the first type of beverage includes regulating the temperature of the refrigerant so as to compensate for the higher freezing point of the first type of beverage and to form a partially frozen low-calorie beverage that is substantially free of large pieces of ice.

16. The method of claim 1, wherein the step of partially freezing the first type of beverage comprises controllably varying a rate of heat exchange between the refrigerant and the first type of beverage.

17. A refrigeration system for a beverage machine, comprising:
a container configured to contain a reduced-calorie beverage having a higher freezing point than a freezing point of a nonreduced-calorie beverage;
at least one compressor configured to circulate a refrigerant through the refrigeration system;
at least one condenser configured to cool the refrigerant flowing within the refrigeration system;
at least one condensing fan configured to flow air across the at least one condenser;
at least one evaporator configured to transfer thermal energy from the reduced-calorie beverage to the refrigerant;
a controller configured to partially freeze the reduced-calorie beverage by maintaining a temperature of the refrigerant across the evaporator between about 15° F to about 30° F and compensating for the higher freezing point of the reduced-calorie beverage than the freezing point of the nonreduced-calorie beverage; and
a dispenser configured to dispense the partially frozen reduced-calorie beverage in a substantially slushy state.

18. The refrigeration system of claim 17, wherein the at least one compressor comprises a variable speed control.

19. The refrigeration system of claim 17, wherein the at least one condensing fan comprises a variable speed control.

20. The refrigeration system of claim 17, further comprising at least one condenser bypass valve configured to direct at least some refrigerant from a condenser inlet to a condenser outlet without first entering the at least one condenser or the at least one condenser bypass valve.

21. The refrigeration system of claim 17, further comprising at least one louver configured to adjust the airflow across the at least one condenser.

22. The refrigeration system of claim 17, further comprising at least one defrost bypass valve configured to direct at least some refrigerant from a compressor outlet to an evaporator inlet without first entering the at least one condenser.

23. The refrigeration system of claim 17, further comprising at least one hot-gas bypass valve and at least one accumulator, the hot-gas bypass valve being configured to direct at least some refrigerant from a compressor outlet to the accumulator without first entering the at least one condenser or the at least one evaporator.

24. The refrigeration system of claim 17, wherein the refrigerant can be charged.

25. The refrigeration system of claim 17, further comprising at least one accumulator.

26. The refrigeration system of claim 17, wherein the partially frozen reduced-calorie beverage has a brix value less than about 10, and has a first amount of ice-crystal formation that is substantially equal to a second amount of ice-crystal formation in a partially frozen nonreduced-calorie beverage.

27. The refrigeration system of claim 17, wherein the partially frozen reduced-calorie beverage has a brix value less than about 7.5, and has a first amount of ice-crystal formation that is substantially equal to a second amount of ice-crystal formation in a partially frozen nonreduced-calorie beverage.

28. The refrigeration system of claim 17, wherein the partially frozen reduced-calorie beverage has a brix value between about 3.5 and about 5.0, and has a first amount of ice-crystal formation that is substantially equal to a second amount of ice-crystal formation in a partially frozen nonreduced-calorie beverage.

29. The refrigeration system of claim 17, wherein the partially frozen reduced-calorie beverage has a brix value of about 0, and has a first amount of ice-crystal formation that is substantially equal to a second amount of ice-crystal formation in a partially frozen nonreduced-calorie beverage.

30. A beverage machine containing a beverage, comprising:
a refrigeration system having an available refrigeration capacity and a controller configured to partially freeze a low-calorie beverage having a lower brix value than a brix value of a high-calorie beverage by adjusting the available refrigeration capacity so as to compensate for the lower brix value of the low-calorie beverage than the higher brix value of the high-calorie beverage; and
a dispenser configured to dispense the partially frozen low-calorie beverage in a substantially slushy state.

31. The beverage machine of claim 30, wherein the brix value of the partially frozen low-calorie beverage ranges from about 0 to about 7.5.

32. The refrigeration system of claim 25, further comprising a liquid line bypass valve configured to direct at least some refrigerant from a condenser outlet to the accumulator without entering the at least one evaporator.

33. A refrigeration system for a beverage machine, comprising:
at least one compressor operated at a speed to circulate a refrigerant through the refrigeration system so as to cool a beverage having a low brix value ranging between about 0 and about 7.5;

at least one condenser configured to cool the refrigerant flowing within the refrigeration system;

at least one condensing fan configured to flow air across the at least one condenser; and a controller configured to partially freeze the beverage by variably adjusting at least one of (1) the flow of air across the at least one condenser and (2) the speed of the at least one compressor so as to compensate for the low brix value of the beverage.

34. The refrigeration system of claim 33, further comprising a dispenser configured to dispense the partially frozen beverage in a substantially slushy state.

35. The refrigeration system of claim 33, wherein the beverage is a diet beverage.

36. The refrigeration system of claim 33, wherein the controller is configured to variably adjust a rate of heat exchange between the refrigerant and the beverage.

37. An apparatus for dispensing a partially frozen diet beverage comprising:

a cooling system configured to partially freeze a diet beverage having a brix value lower than a brix value of a nondiet beverage; and a dispenser configured to dispense a partially frozen diet beverage in a substantially slushy state, wherein the cooling system includes a refrigerant, a compressor, a condenser, an evaporator, and a controller arranged to selectively vary at least one of (1) a speed of the compressor and (2) a flow of air across the condenser so as to regulate a temperature of the refrigerant so as to compensate for the lower brix value of the diet beverage relative to the brix value of the nondiet beverage.

38. The apparatus of claim 37, wherein the controller is arranged to cycle the condenser between on and off positions so as to compensate for the lower brix value of the diet beverage relative to the brix value of the nondiet beverage.

39. The apparatus of claim 37, wherein the cooling system includes a louver, and the controller is arranged to control the louver to selectively direct air across the condenser so as to compensate for the lower brix value of the diet beverage relative to the brix value of the nondiet beverage.

40. The apparatus of claim 37, wherein the cooling system is configured to control the rate of heat exchange between the refrigerant and a heat sink.

41. The apparatus of claim 40, wherein the heat sink is a surrounding environment.

42. A method for dispensing a partially frozen diet beverage comprising:

partially freezing a diet beverage having a brix value lower than a brix value of a nondiet beverage; and dispensing a partially frozen diet beverage in a substantially slushy state, wherein the step of partially freezing includes the step of providing a cooling system configured to partially freeze the diet beverage, and the step of dispensing includes providing a dispenser, and wherein the step of providing a cooling system includes the step of providing a refrigerant, a compressor, a condenser, an evaporator, and the step of selectively varying at least one of (1) a speed of the compressor and (2) a flow of air across the condenser so as to regulate a temperature of the refrigerant so as to compensate for the lower brix value of the diet beverage relative to the brix value of the nondiet beverage.

43. The method of claim 42, wherein the step of selectively varying includes cycling the condenser between on and off positions so as to compensate for the lower brix value of the diet beverage relative to the brix value of the nondiet beverage.

44. The method of claim 42, wherein the step of providing a cooling system includes the step of providing a louver and the step of controlling the louver to selectively direct air across the condenser so as to compensate for the lower brix value of the diet beverage relative to the brix value of the nondiet beverage.

* * * * *